Patented Aug. 9, 1938

2,126,190

UNITED STATES PATENT OFFICE 2,126,190

CELLULOSE ESTERS

Rudolf Hofmann, Dormagen, Germany, assignor to Hercules Powder Company, Wilmington, Del., a corporation of Delaware No Drawing. Application October 21, 1937, Serial No. 170,294. In Germany June 7, 1929

3 Claims. (Cl. 260—101)

The present invention relates to a process of preparing organic cellulose esters.

The manufacture of cellulose esters of fatty acids is carried out in general by means of the anhydride of the fatty acid to be introduced into the cellulose molecule with the aid of an acylation catalyst, such as sulfuric acid, acid sulfuric acid salts, zinc chloride, etc. and with the addition of the corresponding free fatty acid. Said free fatty acid besides exerting a specific action, plays the part of solvent for cellulose ester formed as well as of regulating the course of the reaction. As stated in the literature, the quantity of the free fatty acid used as solvent in the acylation of cellulose normally does not exceed six times the weight of cellulose.

In accordance with the present invention instead of the free fatty acid used as solvent in the acylation of cellulose, for example, in the manufacture of cellulose-acetate, -propionate and -butyrate these being illustrative of the group of lower fatty acid esters of cellulose, there is added as solvent for the cellulose ester formed methylene chloride which is liquid at room-temperature, not miscible with water, and which has a boiling point not higher than water. Methylene chloride is capable of acting as a solvent for the cellulose esters, as for example the primary acetate formed, which, when in the acetylation, for example, sulfuric acid or suitable derivatives or acid salts thereof are used as catalysts, will cause the sulf-acetate as well as the tri-acetate stage to remain in solution. It likewise fulfills the function of a diluent and a regulator of the course of the reaction. With cautious treatment there is no degradation of the cellulose molecule, and crude solutions are produced of unusual homogeneity, viscosity, clearness, and freedom from fibers, so that they are suitable for spinning immediately.

The quantity of methylene chloride used in my process may be varied in wide limits, but the amount required does not exceed the above mentioned normal quantity of the free fatty acid which it is to substitute. A method of carrying out the process consists in partially substituting the free fatty acid by methylene chloride, which method of working is to be included in my invention. The acylation can be effected at ordinary or elevated temperature, say at temperatures up to about 50° C., with the usual catalysts and without prolonging the time of the reaction.

Furthermore, the important fact has been established that by employing the solvent described, i. e., methylene chloride, the reaction can be carried out with astonishingly small quantities of catalysts, for example, 0.5% of sulfuric acid calculated on the weight of the cellulose employed.

In the hitherto customary processes making use of acetic acid, for example as solvent, such a far-reaching reduction in the quantity of catalyst is impossible since this invariably leads to completely gelatinized products. In the process in accordance with the present invention the reaction can be carried out very satisfactorily in spite of the reduction of the quantity of catalyst.

The esterification can be completed under such conditions at elevated temperature, for example at about 50° C. in less than 5 hours, whereby a clear crude solution of high viscosity is produced, which shows no tendency to gelatinize and which is suitable for direct spinning.

When, for example, acetylation is effected, the tri-acetate contained in the crude solution can be isolated by precipitation, for example with water. The tri-acetate is soluble to give a completely clear solution in, for example, methylene chloride. These solutions possess an astonishingly high viscosity, an indication that the cellulose material was protected to a far-reaching extent during the acetylation. From these solutions films of high tensile strength and high stability to water can be prepared.

In consequence of the excellent solvent properties of methylene chloride in respect of the acyl cellulose produced, considerable economies of anhydride can be made in the primary process; nevertheless, the crude solution does not acquire a gelatinous character.

The conversion of the primary product of acylation into other stages of solubility, for example into the stage of acetone solubility can be carried out by an appropriate addition of water or an aqueous acid solution to the crude solution. An addition of fatty acid, for example of acetic acid, in the hydrolizing process, is not necessary since the water added in the hydrolysis is absorbed by the crude solution without separation of the methylene chloride.

The hydrolysis, for example to acetone solubility, can likewise be carried out in about 5 hours by a suitable selection of the conditions of hydrolysis with the result that the total reaction process in the primary and secondary stages can be completed in about 8–10 hours. It is possible by appropriate control of the secondary stage to produce products of normal viscosity and also such of unusually high viscosity. Furthermore, the hydrolized crude solutions are likewise suitable for direct spinning.

The isolation of the cellulose esters from the crude solution can be accomplished according to one of the known processes. By proceeding, for example, by precipitation with water, it is advantageous to add so much water to the crude solution that a 40–50% fatty acid, for example acetic acid results. In the acid separated from the precipitated product only a small percentage of methylene chloride is then found dissolved, which can be recovered in the known manner, for example by distillation either before or during the recovery of the acetic acid. The principal portion remains included in the precipitated acyl cellulose and is separated quantitatively therefrom by heating; after drying it can again be returned to the cycle of manufacture in a completely unimpaired condition.

The invention is illustrated by the following examples, without being limited thereto, the parts being by weight:

*Example 1.*—100 parts of cotton are introduced into a mixture of 350 parts of acetic anhydride, 6.5 parts of sodium bisulfate containing about 0.7 part of free sulfuric acid, and 350 parts of methylene chloride. A clear highly viscous tri-acetate solution is obtained at room temperature after 24 hours. The acetylation process can be accelerated by the use of higher temperatures (for example below 50° C.) and completed in, say from 8–12 hours. In order to separate the tri-acetate from the crude solution and to recover the acetic acid and acetic anhydride the triacetate is precipitated, for example, with benzene, and washed. The liquid mixture which is thus separated, is split up into its components, acetic acid, acetic anhydride, benzene and methylene chloride by fractional distillation.

The primary acetate solution thus prepared is subjected to hydrolysis in the customary manner at a temperature below 50° C., with approximately 180 parts of about 50% acetic acid, to which are added, if desired or necessary, about 13 parts of sulfuric acid, until, for example, a clear acetone solubility is obtained.

The acetone soluble acetate is precipitated with water, washed and dried.

The working up of the dilute acetic acid follows according to one of the known methods, the presence of the methylene chloride greatly facilitating the concentration of the acetic acid.

*Example 2.*—100 parts of cotton linters, which if desired have been rendered more reactive by a pretreatment according to one of the known processes, are introduced at room temperature into a mixture of 300 parts of acetic anhydride, 300 parts of methylene chloride and 0.5 part of concentrated sulfuric acid. In the course of one hour an increase in temperature to about 35° C. takes place, whereupon the temperature again falls. About 2–3 hours after the commencement of the acetylation the reaction mixture is brought to a temperature of about 50° C. by the application of external heat. After a further 2 hours a completely clear highly viscous crude solution is obtained. With this solution 80 parts of water are incorporated. After decomposition of the excess anhydride 4–6 parts of hydrochloric acid (100%) in the form of concentrated hydrochloric acid are added and the temperature is raised to about 50° C. The hydrolysis is interrupted as soon as the desired degree of solubility, for example acetone solubility, is attained. Obviously the tri-acetate can also be isolated by first neutralizing the catalyst, for example with the calculated quantity of sodium acetate, and then precipitating with water. The product is completely stable and dissolves, for example in methylene chloride, to give a clear highly viscous solution, which can be spun or worked up to films and plastic masses.

*Example 3.*—100 parts of bleached cotton linters which may have been rendered more reactive by a pretreatment according to one of the known processes are introduced at room temperature into a mixture of 400 parts of propionic acid anhydride, 300 parts of methylene chloride and 1 part of concentrated sulfuric acid. During about one hour the temperature rises to about 30° C., whereupon it is again diminishing. 3 to 4 hours after the reaction has been started the mass is warmed to about 40° C. After about 8 to 10 hours from the beginning the reaction is terminated. The crude solution is clear and free from fibers. After adding 40 parts of water the crude solution of cellulose tri-propionate may be hydrolyzed in any known manner. Or, the cellulose tri-propionate which is acetone soluble as such may be isolated from the crude solution.

*Example 4.*—100 parts of bleached cotton linters which may have been rendered more reactive by a pretreatment according to one of the known processes, are introduced at room temperature into a mixture of 500 parts of butyric acid anhydride, 300 parts of methylene chloride and one part of concentrated sulfuric acid. In the course of one hour the temperature rises to 28° C. and is, thereupon diminishing again. Now the temperature is raised by warming so that 40° C. are reached after 4 to 5 hours from the beginning of the reaction. After 12 to 14 hours from the beginning of the reaction a clear and fiber-free crude solution of cellulose tri-butyrate is obtained. If the reaction is carried out at lower temperatures, naturally more time is required; for instance, when working at room temperature the reaction takes about 60 hours.

The crude solution of cellulose tri-butyrate either may be hydrolyzed after adding 50 parts of water, according to any of the known methods, or the cellulose tributyrate may be isolated therefrom which, owing to its acetone solubility, can be directly used for various purposes.

This application is a continuation in part of my application Serial No. 459,116, filed June 3, 1930.

I claim:

1. The process of producing cellulose esters of lower fatty acids which comprises reacting cellulose with the anhydride of a lower fatty acid at a temperature between room-temperature and about 50° C., in the presence of an effective amount of an esterification catalyst and of methylene chloride in an amount sufficient to regulate the course of the reaction and to cause the cellulose ester formed to remain in solution, whereby a crude homogeneous, highly viscous, solution of the cellulose ester showing no tendency to gelatinize under esterification conditions is produced.

2. The process of producing cellulose acetate which comprises reacting cellulose with acetic anhydride, at a temperature between room temperature and about 50° C., in the presence of an effective amount of an acetylation catalyst and of methylene chloride in an amount sufficient to regulate the course of the reaction and to cause the cellulose triacetate formed to remain in solution, whereby a crude homogeneous, highly viscous, solution of cellulose triacetate showing no tendency to gelatinize under acetylation conditions is produced.

3. The process as defined in claim 2, according to which the acetylation catalyst consists of sulphuric acid.

RUDOLF HOFMANN.